(12) United States Patent
Zhou

(10) Patent No.: US 10,035,939 B2
(45) Date of Patent: Jul. 31, 2018

(54) REFRIGERANT COMPOSITION AND ITS PREPARATION METHOD

(71) Applicant: ICOOL NINGBO CO.,LTD, Ningbo (CN)

(72) Inventor: Lingmei Zhou, Ningbo (CN)

(*) Notice: Subject to any disclaimer, the term of this patent is extended or adjusted under 35 U.S.C. 154(b) by 0 days.

(21) Appl. No.: 15/802,932

(22) Filed: Nov. 3, 2017

(65) Prior Publication Data

US 2018/0155593 A1    Jun. 7, 2018

(30) Foreign Application Priority Data

Sep. 27, 2016 (CN) .......................... 2016 1 0851442

(51) Int. Cl.
*C09K 5/04* (2006.01)

(52) U.S. Cl.
CPC .............. *C09K 5/045* (2013.01); *C09K 5/042* (2013.01); *C09K 2205/122* (2013.01)

(58) Field of Classification Search
CPC .......... C09K 2205/12; C09K 2205/122; C09K 5/04; C09K 5/045
USPC ......................................... 252/67.68, 67, 68
See application file for complete search history.

(56) References Cited

U.S. PATENT DOCUMENTS

| | | | |
|---|---|---|---|
| 5,624,596 A | 4/1997 | Lunger et al. | |
| 6,592,774 B2* | 7/2003 | Byung Gwon | C09K 5/045 252/67 |
| 6,783,691 B1 | 8/2004 | Bivens et al. | |
| 6,841,087 B2* | 1/2005 | Lee | C09K 5/045 252/67 |
| 7,410,595 B2 | 8/2008 | Roberts et al. | |
| 7,504,043 B2* | 3/2009 | Guilpain | C09K 5/045 134/22.11 |
| 8,603,640 B2* | 12/2013 | Kennedy | B27K 3/36 106/17 |
| 8,652,348 B1* | 2/2014 | Shihab | F25B 45/00 252/67 |
| 9,028,707 B2* | 5/2015 | Minor | C09K 5/045 252/68 |
| 2003/0111636 A1* | 6/2003 | Byung Gwon | C09K 5/045 252/67 |
| 2003/0197149 A1* | 10/2003 | Lee | C09K 5/045 252/67 |
| 2004/0016902 A1* | 1/2004 | Lee | C09K 5/045 252/67 |
| 2004/0016903 A1* | 1/2004 | Lee | C09K 5/045 252/67 |
| 2007/0187638 A1* | 8/2007 | Guilpain | C09K 5/045 252/67 |
| 2012/0003492 A1* | 1/2012 | Kennedy | B27K 3/36 428/541 |
| 2012/0096877 A1* | 4/2012 | Yana Motta | C09K 5/045 62/79 |
| 2017/0131009 A1* | 5/2017 | Harkins | C09K 5/045 |

FOREIGN PATENT DOCUMENTS

| | | |
|---|---|---|
| CN | 107695 | 10/1993 |
| CN | 101157849 | 4/2008 |

* cited by examiner

*Primary Examiner* — Douglas J McGinty
(74) *Attorney, Agent, or Firm* — Jeremy A. Smith; Timothy Capria; Bradley Arant Boult Cummings LLP

(57) ABSTRACT

The invention relates to a refrigerant composition and its preparation method, which is characterized by the composition of the following weight percentages:
  1,1,1-trifluoroethane: 1-3%
  Difluoromethane: 8-12%
  Pentafluoroethane: 40-44%
  1,1,1,2-tetrafluoroethane: 42-46%
  N-butane: 2-4%.

Compared with the existing technology, the refrigerant composition provided by the present invention can be used to replace R22 and charged directly into such refrigeration and air conditioning systems as household air conditioner/heat pump unit, unitary air conditioners, refrigeration condensing units, water chillers and other. And the present invention is very close to the physical parameters of R22, compatible with the lubricating oil, conduits and components of the existing R22 system and can also be directly charged to replace R22 with a low cost and good refrigeration efficiency and cooling effect. Moreover, this invention will not deplete the stratospheric ozone layer while having a simple preparation method.

7 Claims, No Drawings

REFRIGERANT COMPOSITION AND ITS PREPARATION METHOD

TECHNICAL FIELD OF THE INVENTION

The invention relates to refrigerants, specifically a refrigerant composition and its preparation method.

BACKGROUND OF THE INVENTION

As the most widely used medium-and-low temperature refrigerant at present, R22 is extensively applied in household air conditioners, commercial air conditioning, central air conditioning, portable air conditioners, heat pump water heater, dehumidifier, frozen-type dryer, cold storage, food refrigeration equipment, Marine refrigeration equipment, industrial refrigeration, commercial refrigeration, refrigeration condensing units, supermarket display cabinets and other refrigeration and air conditioning equipment. R22 (with its chemical name being chlorodifluoromethane) falls into the classification of HCFCs, possessing an ozone layer depletion potential (ODP) of 0.055 and a global warming potential (GWP) of 1700. Besides its depletion to the ozone layer, R22 also has a high greenhouse effect. According to the requirements of the Copenhagen amendment to Montreal Protocol on substances that deplete the ozone layer, R22 can only be used as a transitional working medium. Therefore, the developed countries will be required to fully eliminate the use of R22 by 2020 and the developing countries will be fully banned from using it by 2030. The EU has a made a faster move to have banned the import of HCFCs and the refrigeration and air conditioning equipment containing HCFCs since 2015.

At present, there are a lot of R22 units still in use in the market, and even large quantities of new R22 units are being manufactured each year for use. Under this situation, in the countries or regions where the HCFCs substances have been reduced or eliminated, the cost for maintaining and repairing the R22 units in service or replenish refrigerant wherein is very high. After 2020, the developed countries will totally face the problem of maintaining R22 units. And after 2030, the developing countries will also face such a problem. If the units are eliminated or replaced simply because the charged refrigerant does not meet the requirements of environmental protection, it will result in a waste of a large amount of resources and require the investment of a large amount of capital. Therefore, it is of significant importance to research and develop an alternative refrigerant which is not only compatible with the existing R22 units and can be used in mixture with R22 refrigerant, but also can be charged directly into the units in service and is in line with the laws and regulations with respect to the current refrigerant applications.

The existing single component refrigerant alternatives to R22 such as R32, R125, R143a, R134a and others cannot be directly charged into the existing units to replace R22. And the existing commonly-used blended refrigerant alternatives, such as R410A (a blend of R32 and R125), R407C (a blend of R32, R125 and R134a), R404A (a blend of R125, R143a and R134a), and R507A (a mixture of R125 and R143a), are incompatible with the working pressure and lubricant of R22 system, hence they cannot be charged directly into the units in service to replace R22. Moreover, substitutes such as R417A (a mixture of R125, R134a and R600), R422D (a mixture of R125, R134a and R600a) and others which have been developed specifically for R22 have shown a low efficiency and poor refrigeration performance after being used in the existing units to replace R22. In addition, the patent application US 2008029733 disclosed a composition consisting of pentafluoroethane, tetrafluoroethane and hydrocarbons and others; the patent application CN 200710156803.6 disclosed a composition consisting of R161, R32 and hydrocarbons and others; the patent application CN 93102698.9 disclosed a composition consisting of R32, R134a and one of the R152a, R143a and R290 and others; the U.S. Pat. No. 6,783,691 disclosed a composition consisting of R32, R125, R134a and hydrocarbons; the U.S. Pat. No. 5,624,596 disclosed a composition consisting of R32, R125 and hydrocarbons. These compositions mentioned in the above patent publications have all been developed for the purpose of replacing R22, but these compounds have such problems of either being incompatible with R22 system, or of low refrigeration efficiency, or being expensive and costing high replacement expenses.

BRIEF SUMMARY

One technical problem the present invention is intended to solve is to provide a refrigerant composition which is equivalent to R22 in terms of physical parameters and compatible with the lubricating oil, conduits and components of the existing R22 equipment system against the background of the existing technology.

The other technical problem the present invention is intended to solve is to provide a method of preparing a refrigerant composition which is equivalent to R22 in terms of physical parameters and compatible with the lubricating oil, conduits and components of the existing R22 equipment system against the background of the existing technology. The technical scheme adopted by the present invention to solve the above technical problems is as below:
the inventive refrigerant composition is characterized by a composition of the following weight percentages:
 1,1,1-trifluoroethane: 1-3%
 Difluoromethane: 8-12%
 Pentafluoroethane: 40-44%
 1,1,1,2-tetrafluoroethane: 42-46%
 N-butane: 2-4%.
The preferred composition proportion is:
 1,1,1-trifluoroethane: 2%
 Difluoromethane: 10%
 Pentafluoroethane: 42%
 1,1,1,2-tetrafluoroethane: 42%
 N-butane: 4%.

For the 1,1,1-trifluoroethane(R143a) of the above components, its molecular formula is $CH_3CF_3$, molar mass is 84.04, normal boiling point is −47.2° C., critical temperature is 72.7° C., and its critical pressure is 3.76 MPa.

The Difluoromethane (R32) wherein, with its molecular formula of $CH_2F_2$, has a molar mass of 52.02, a normal boiling point of 51.7° C., a critical temperature of 78.1° C., and a critical pressure of 5.78 MPa.

The Pentafluoroethane (R125) wherein, with its molecular formula of $CHF_2CF_3$, has a molar mass of 120.02, a normal boiling point of 48.1° C., a critical temperature of 66.0° C., and a critical pressure of 3.62 MPa.

The 1,1,1,2-tetrafluoroethane (R134a) wherein, with its molecular formula of $CH_2FCF_3$, has a molar mass of 102.03, a normal boiling point of 26.1° C., a critical temperature of 101.1° C., and a critical pressure of 4.06 MPa.

The N-butane (R600) wherein, with its molecular formula of $CH_3CH_2CH_2CH_3$, has a molar mass of 58.12, a normal boiling point of 0.5° C., a critical temperature of 152.0° C., and a critical pressure of 3.80 MPa.

The preparation method of the above refrigerant composition is featured by a physical mixing of the said 1,1,1-trifluoroethane(R143a), Difluoromethane (R32), Pentafluoroethane (R125), 1,1,1,2-tetrafluoroethane (R134a) and N-butane (R600) in their liquid phase according to the corresponding proportion.

Compared with the existing technology, the refrigerant composition provided by the present invention can be used to replace R22 and charged directly into such refrigeration and air conditioning systems as household air conditioner/heat pump unit, unitary air conditioners, refrigeration condensing units, water chillers and other. And the present invention is very close to the physical parameters of R22, compatible with the lubricating oil, conduits and components of the existing R22 system and can also be directly charged to replace R22 with a low cost and good refrigeration efficiency and cooling effect. Moreover, this invention will not deplete the stratospheric ozone layer while having a simple preparation method.

DETAILED DESCRIPTION

In order to facilitate the understanding of the refrigerant substitute and their advantages of the invention, a few specific embodiments are given below, in which the proportion of each component is represented by weight percentages.

Embodiment 1 making a physical mixture of 1% of the 1,1,1-trifluoroethane, 8% of Difluoromethane, 44% of Pentafluoroethane, 45% of 1,1,1,2-tetrafluoroethane and 2% of n-butane in the liquid phase to form a refrigerant.

Embodiment 2 making a physical mixture of 2% of the 1,1,1-trifluoroethane, 10% of Difluoromethane, 41% of Pentafluoroethane, 43% of 1,1,1,2-tetrafluoroethane and 4% of n-butane in the liquid phase to form a refrigerant.

Embodiment 3 making a physical mixture of 3% of the 1,1,1-trifluoroethane, 12% of Difluoromethane, 40% of Pentafluoroethane, 42% of 1,1,1,2-tetrafluoroethane and 3% of n-butane in the liquid phase to form a refrigerant.

Embodiment 4 making a physical mixture of 1% of the 1,1,1-trifluoroethane, 11% of Difluoromethane, 42% of Pentafluoroethane, 44% of 1,1,1,2-tetrafluoroethane and 2% of n-butane in the liquid phase to form a refrigerant.

Embodiment 5 making a physical mixture of 1% of the 1,1,1-trifluoroethane, 9% of Difluoromethane, 43% of Pentafluoroethane, 44% of 1,1,1,2-tetrafluoroethane and 3% of n-butane in the liquid phase to form a refrigerant.

Embodiment 6 making a physical mixture of 2% of the 1,1,1-trifluoroethane, 8% of Difluoromethane, 40% of Pentafluoroethane, 46% of 1,1,1,2-tetrafluoroethane and 4% of n-butane in the liquid phase to form a refrigerant.

Under the operation condition of evaporation temperature at 7.2° C., condensation temperature at 54.4° C., overheating temperature at 11.1° C., supercooling temperature at 8.3° C. and compressor efficiency at 85%, the environmental parameters, physical parameters and thermal properties of the refrigerants in the above embodiment are listed in Table 1, below.

TABLE 1 the environmental parameters, physical parameters and thermal properties of the refrigerants

| Parameters | Embodiment 1 | Embodiment 2 | Embodiment 3 | Embodiment 4 | Embodiment 5 | Embodiment 5 | R22 |
|---|---|---|---|---|---|---|---|
| ODP | 0 | 0 | 0 | 0 | 0 | 0 | 0.055 |
| GWP | 2280 | 2210 | 2220 | 2220 | 2240 | 2200 | 1700 |
| Molar Mass g/mol | 99.23 | 95.43 | 94.08 | 96.25 | 97.46 | 97.04 | 86.47 |
| Critical Temperature ° C. | 83.71 | 83.33 | 82.94 | 83.41 | 83.45 | 84.27 | 96.15 |
| Critical Pressure MPa | 4.166 | 4.196 | 4.261 | 4.255 | 4.181 | 4.145 | 4.99 |
| Evaporation Pressure kPa | 594.3 | 601.7 | 621.5 | 613.0 | 598.2 | 579.2 | 625.3 |
| Condensation Pressure kPa | 2157.9 | 2171.9 | 2239.1 | 2220.6 | 2165.7 | 2101.4 | 2152.3 |
| Exhaust Temperature ° C. | 81.0 | 81.7 | 82.9 | 82.6 | 81.3 | 80.8 | 99.6 |
| COP* | 1.01 | 1.01 | 1.01 | 1.01 | 1.01 | 1.01 | 1 |
| Volume Refrigerating Capacity* | 0.97 | 0.98 | 1.01 | 1.00 | 0.99 | 0.98 | 1 |
| Mineral Oil Solubility** | Soluble | Soluble | Soluble | Soluble | Soluble | Soluble | — |
| Material Compatibility** | Compatible | Compatible | Compatible | Compatible | Compatible | Compatible | — |

TABLE 1-continued the environmental parameters, physical parameters and thermal properties of the refrigerants

| Parameters | Embodiment 1 | Embodiment 2 | Embodiment 3 | Embodiment 4 | Embodiment 5 | Embodiment 5 | R22 |
|---|---|---|---|---|---|---|---|
| Directly Chargable or not** | Chargable | Chargable | Chargable | Chargable | Chargable | Chargable | — |
| Replacement Cost | Low | Low | Low | Low | Low | Low | — |

Note:
*indicates the ratio relative to R22,
**indicates the result of the compatibility test.

a. Environmental Performance

It can be seen from Table 1 that the invention's ODP value is zero, causing no damage to the stratospheric ozone layer, meeting the demands for substitutes by the Montreal protocol. Therefore, it can be used as an environmentally-friendly alternatives for the repair and maintenance of the systems and equipment in service after the use of refrigerant R22 is reduced or banned.

b. Basic Physical Parameters

It can be seen from Table 1 that the critical parameters (critical temperature and critical pressure) and the thermal parameters (evaporation pressure, condensation pressure, exhaust temperature) of the invention are very close to R22, ensuring the safe and steady operation of the existing R22 systems after they are charged with this invention.

c. The Thermal Performance

It can be seen from Table 1 that the thermal performance (COP, volume refrigerating capacity) of the invention is equivalent to R22, ensuring that a similar refrigerating capacity and cooling effect can be obtained after the R22 system is charged with this invention.

d. Direct-Charge Performance

The present invention is dissolved with the lube used in the R22 units in service through the solubility test of the mineral oil (MO) used in the R22 system. And the present invention is also compatible with the components and materials used in the existing R22 units through the compatibility test of the metal materials, plastic materials and elastic materials used in R22 system. Therefore, the existing R22 system can be charged with this invention directly.

e. Replacement Cost

Each component of the present invention is easy to obtain with a relatively low price, and this invention which is compatible with R22 can be blended with R22 by arbitrary proportion. Besides, the invention can be charged in part or whole into the existing R22 system with a low replacement cost.

To sum up, the present invention is very close to the physical parameters of R22, compatible with the lubricating oil, conduits and components of the existing R22 system and can also be directly charged to replace R22 with a low cost and good refrigeration efficiency and cooling effect, causing no damage to the stratospheric ozone layer, which makes it an ideal substitute to be charged directly into such refrigeration and air conditioning systems as household air conditioner/heat pump unit, unitary air conditioners, refrigeration condensing units, water chillers and others to replace R22.

What is claimed is:

1. A refrigerant composition, comprising, by weight percent:
   1,1,1-trifluoroethane in an amount of 1-3%;
   Difluoromethane in an amount of 8-12%;
   Pentafluoroethane in an amount of 40-44%;
   1,1,1,2-tetrafluoroethane in an amount of 42-46%; and
   N-butane in an amount of 2-4%.

2. The refrigerant composition of claim 1, comprising, by weight percent:
   1,1,1-trifluoroethane in an amount of 2%;
   Difluoromethane in an amount of 10%;
   Pentafluoroethane in an amount of 42%;
   1,1,1,2-tetrafluoroethane in an amount of 42%; and
   N-butane in an amount of 4%.

3. The preparation method of the refrigerant composition described in claim 1 or claim 2, wherein the refrigerant composition is prepared by a process of physically mixing of 1,1,1-trifluoroethane (R143a), Difluoromethane (R32), Pentafluoroethane (R125), 1,1,1,2-tetrafluoroethane (R134a) and N-butane (R600) in their liquid phase according to their respective amounts.

4. A refrigerant composition consisting of, by weight percent:
   1,1,1-trifluoroethane in an amount of 2%;
   Difluoromethane in an amount of 10%;
   Pentafluoroethane in an amount of 42%;
   1,1,1,2-tetrafluoroethane in an amount of 42%; and
   N-butane in an amount of 4%.

5. The preparation method of the refrigerant composition described in claim 4, wherein the refrigerant composition is prepared by a process of physically mixing of 1,1,1-trifluoroethane, difluoromethane, pentafluoroethane, 1,1,1,2-tetrafluoroethane and N-butane in their liquid phase according to their respective amounts.

6. A refrigerant composition consisting of, by weight percent:
   1,1,1-trifluoroethane in an amount of 1-3%;
   Difluoromethane in an amount of 8-12%;
   Pentafluoroethane in an amount of 40-44%;
   1,1,1,2-tetrafluoroethane in an amount of 42-46%; and
   N-butane in an amount of 2-4%.

7. The preparation method of the refrigerant composition described in claim 6, wherein the refrigerant composition is prepared by a process of physically mixing of 1,1,1-trifluoroethane, difluoromethane, pentafluoroethane, 1,1,1,2-tetrafluoroethane and N-butane in their liquid phase according to their respective amounts.

* * * * *